UNITED STATES PATENT OFFICE.

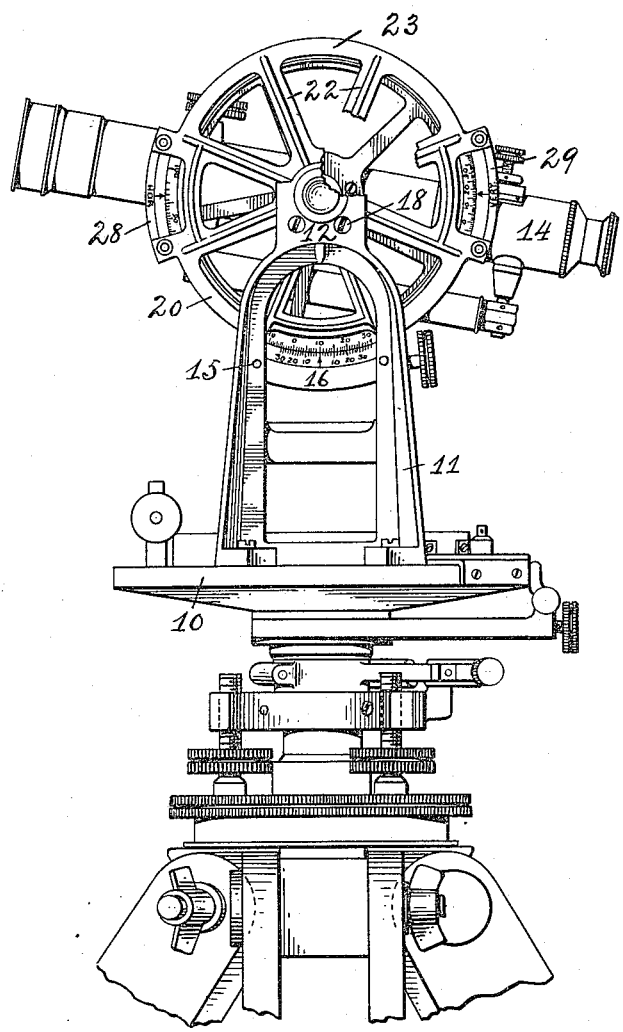

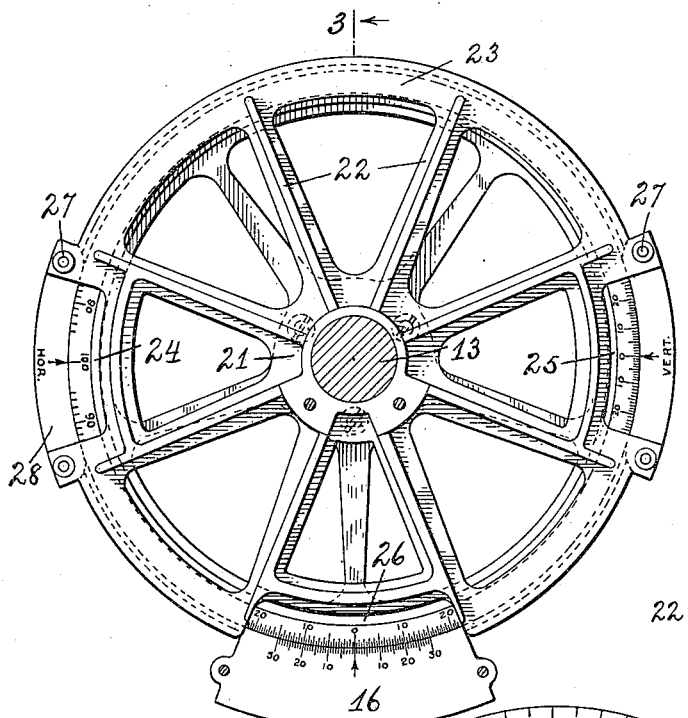
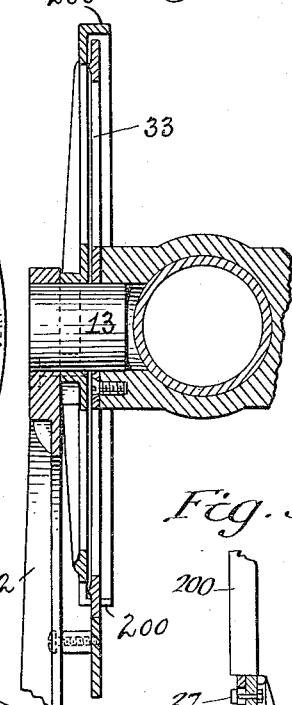
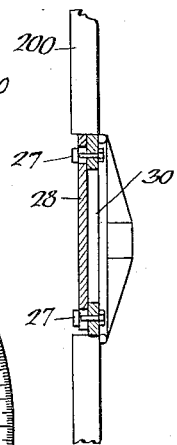
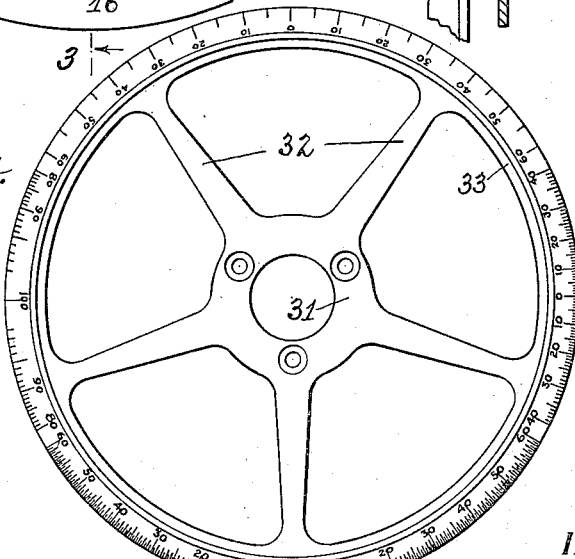

WILLIE L. E. KEUFFEL, OF HOBOKEN, NEW JERSEY, ASSIGNOR TO THE KEUFFEL & ESSER COMPANY, OF HOBOKEN, NEW JERSEY, A CORPORATION OF NEW JERSEY.

STADIA-TRANSIT.

1,154,253.   Specification of Letters Patent.   Patented Sept. 21, 1915.

Application filed December 10, 1913. Serial No. 805,321.

*To all whom it may concern:*

Be it known that I, WILLIE L. E. KEUFFEL, a citizen of the United States, residing at Hoboken, in the county of Hudson and State of New Jersey, have invented certain new and useful Improvements in Stadia-Transit, of which the following is a specification.

This invention relates to a device adapted to be attached to a surveyor's transit for the purpose of taking stadia readings directly in terms of horizontal and vertical distance without the use of formulæ, charts, elaborate tables or slide rules, and its novelty consists in the construction and adaptation of the parts, as will be more fully hereinafter pointed out.

Surveyor's transits, as part of their usual equipment, usually comprise a telescope provided with three fine horizontal cross wires called stadia wires and with a vertically arranged arc or circle secured to the telescope and the center of which is coincident with the center of oscillation of the telescope. In use, a rod man sets up his stadia rod at a point the distance of which from the place where the telescope is erected is to be determined. Assuming that the rod and telescope support are both resting on a level surface, the observer looks through the telescope and reads on the rod the distance which the upper and lower stadia wires of the telescope apparently subtend. This distance, multiplied by a constant factor (usually 100 or thereabout), gives the distance between the instrument and the rod. If the instrument is not on a level with the rod it must be inclined in order to sight the rod. When the rod has been sighted and the distance on it apparently subtended by the upper and lower stadia wires has been read, this reading multiplied by the constant referred to no longer gives the correct distance because of the angle of inclination of the telescope. In order to ascertain the correct horizontal distance the formula $$x = r \cos.^2 a$$

must be used in which $x$ is the required distance, $r$ is the observed stadia distance and $a$ is the angle of the inclination of the telescope to the horizontal. In order to ascertain the difference in elevation, or level, between the rod and the instrument the formula $$y = \tfrac{1}{2} r \sin. a$$

must be employed in which $y$ is the required distance and the other factors are as before. It is obvious that the ascertainment of distances by the use of such formula involving sines and cosines and arbitrary factors involves much labor in computation and, on account of the tables which are employed, results in errors of observation and calculation which should be avoided if possible.

As stated above, the telescope of such an instrument is provided with a vertical circle or arc swinging with it and by which its angular displacement is measured. Practically only the upper and lower quadrants of this circle are graduated because when the telescope is tilted beyond such graduations the line of sight is obstructed by the frame of the instrument or the rod is outside of a practical position. I employ the right and left quadrants of this circle which are practically of no value and are left blank for the purpose of placing thereon accurately calculated scales whereby there may be read directly on such scales factors for both the horizontal and vertical distance of the rod which multiplied by the observed stadia distance will give the correct distance without further computation.

In the drawings, in which there is illustrated an instrument embodying a preferred form of my invention, Figure 1 is a side elevation of the instrument; Fig. 2 is a detail of the index support and scale guard; Fig. 3 is a section through the same on the plane of the line 3—3 in Fig. 2, and Fig. 4 is a detail of the vertical circle showing the horizontal and vertical scales. Fig. 5 is a detail sectional view illustrating the mounting of one of the index segments.

In the drawings, 10 indicates the base of the instrument, 11 standards secured thereto in any usual suitable manner and terminating at their upper ends in axle boxes 12, adapted to receive the trunnions 13 of the telescope 14. This latter is of any usual, or suitable, size and shape preferably one of the standard forms. Within the telescope tube and properly arranged intermediate the eye piece and objective there are provided the usual horizontal stadia wires. These are not illustrated because they are well known in the art. Between the legs of one standard on one side is adjustably secured, for instance by screws 15, an arcuate vernier 16 with its "0" point at the vertical center and immediately beneath the center of oscillation of the telescope. Rigidly secured to one of the standards, in any suitably manner for instance by screws indicated at 18, is a guard and index holder 20 consisting of a central annular boss 21, radial ribs 22 and an outer ring 23, provided at two diametrically opposite places with recesses indicated at 24 and 25 and at a third intermediate place with a recess indicated at 26. This guard is preferably made of one piece of suitable metal. Adjustably secured in the recesses 24 and 25 by means of screws 27 that pass through the slots therein, or in any other suitable manner, are index segments one 28 marked "Hor." or "Horizontal," and the other 29 marked "Vert." or "Vertical" or by any other suitable designation. The segments are adjustably mounted in order that they may be readily alined and that accuracy may thereby be obtained. It will be understood that this guard is mounted so that the inner peripheries of such segments are upon a circle the center of which coincides with the center of oscillation of the telescope and the arcs of which coincide with the outer periphery of a vertical circle 30. The outer periphery of the guard except where it is recessed is provided with an internal annular flange 200.

Suitably secured to oscillate with the telescope tube is the graduated vertical circle 30 similar in construction with the standard equipment of this kind and having a central hub 31, radial spokes 32 and outer rim 33 which is graduated in its upper and lower quadrants (speaking of these in the position of the circle when the line of collimation of the telescope is horizontal) in degrees and minutes, about 60° each way right and left reading from "0". In the right quadrant it is graduated from "0" up and down in accordance with a notation based upon the sine of the angle of variation of inclination of the telescope, and in the left quadrant it is graduated from "100" up and down in accordance with a notation based upon the cosine of the same angle. These graduations are so calculated as to represent constant factors one for each angle of inclination of the telescope but varying of course with the different angles.

Between the legs of the standard on which the guard 20 is mounted is the usual segment 16 carrying an index pointer and vernier, as stated.

The manner of the use of the device is simple. The transit being set up in a suitable central place, the rodman places his stadia rod in an upright position at the place the distance of which from the instrument is to be ascertained. If the instrument and stadia rod are on the same level the graduations on the left or horizontal scale of the vertical circle will be at "100" and opposite its index arrow and on the left or vertical scale will be at "0" opposite its index arrow. Then the observed stadia subtention multiplied by 100 will equal the distance horizontally of the rod from the telescope and the same distance multiplied by "0" will equal the vertical height of the rod above or below the telescope and as the result is "0" it is seen that the telescope and rod are on the same level. If the telescope must be tilted to see the graduations on the rod, the observed readings multiplied by the indicated constant factors on the scales opposite the fixed index pointers gives the vertical and horizontal distances at once. A small multiplication table will even permit of this computation being dispensed with.

The advantages of the invention seem obvious. Utilizing the usual vertical circle with which these instruments must be equipped as the carrier for the scales desired saves the manufacture of different scales and the cost of their attachment to the instrument. The horizontal and vertical scales being on the edge of the full circle the opportunity for a relatively coarse marking is afforded and great accuracy insured both in making and using the scales. The index pointers being fixed after their initial adjustment at the shop by means of the screws they are not readily displaced, and as the pointers are on a plane surface coincident with the graduated surface of the circle accuracy of observation is promoted. Not only that but as the horizontal and vertical scales are distinct and independent and each has its own index, an error in observing one reading if made is not likely to be transmitted to the other. The guard which carried the index segments serves by its internal flange to save the circle from injury.

It is obvious that the positions of the horizontal and vertical scales may be interchanged or varied without departing from the principles of the invention.

What I claim is:

1. In an instrument of the character set forth, the combination with a support and telescope provided with stadia wires and mounted to oscillate on said support, of associated elements, one being on the support and the other moving with the telescope, said elements having scales and coacting indexes, said scales being disposed at different points around the axis of movement of the telescope, one of said scales being gradnated in terms of horizontal constants varying with each angle of inclination of the telescope, a second of said scales being graduated in terms of vertical constants varying with each angle of inclination of the telescope, and a third of said scales being graduated in terms of angular displacement.

2. In an instrument of the character set forth, the combination with a support and a telescope provided with stadia wires and mounted to oscillate on said support, of a vertical circle fixed to the telescope and having its center coincident with the center of oscillation of said telescope, a guard ring extending over the circle and having cut out portions exposing the two vertical arcs of said circle and a horizontal arc of the same, one of said vertical arcs having a scale thereon graduated in terms of horizontal constants varying with each angle of inclination of the telescope, an element carrying an index for said scale carried by the guard ring, the other vertical arc of the circle having a scale thereon graduated in terms of vertical constants varying with each angle of inclination of the telescope, a second element having an index for said second scale carried by the guard ring, the horizontal exposed arc of the circle having a third scale graduated in terms of angular displacement, and an element carrying a third index for said third scale.

3. In a structure of the character set forth, the combination with a support and telescope provided with stadia wires and mounted to oscillate on said support, of a vertical circle having its center coincident with the axis of oscillation of the telescope and fixed to said telescope, said circle having a scale on one arc graduated in terms of horizontal constants varying with each angle of inclination of the telescope, and having a second scale on another arc graduated in terms of vertical constants varying with each angle of inclination of the telescope, separate elements carrying indexes for the said scales, securing means for the elements permitting their adjustment and normally holding them against movement, a third arc of the circle having a third scale graduated in terms of angular displacement, and a third element having an index for said third scale.

In testimony whereof I affix my signature in presence of two witnesses.

WILLIAM L. E. KEUFFEL.

Witnesses:
 Mary H. Lewis,
 Helen V. Fitzpatrick.